United States Patent [19]

Bird et al.

[11] Patent Number: 5,471,916
[45] Date of Patent: Dec. 5, 1995

[54] BARBEQUE GRILL WITH ASH SWEEP AND INTEGRAL SHELF LID HOLDER

[75] Inventors: Richard Bird; Edward Golladay, Jr.; Donald Payne, all of Louisville, Ky.; Randy Smitley, Lanesville, Ind.; Calvin Sprinkle, Borden, Ind.; Marine Walls, Jeffersonville, Ind.

[73] Assignee: Porcelain Metals Corporation, Louisville, Ky.

[21] Appl. No.: 289,770

[22] Filed: Aug. 12, 1994

[51] Int. Cl.⁶ .................................. A47J 37/07; F24B 3/00
[52] U.S. Cl. ........................... 99/446; 99/449; 99/450; 126/25 R; 126/41 R
[58] Field of Search ..................... 99/444–446, 447, 99/449, 450, 339, 340, 482; 126/25 R, 9 R, 9 A, 9 B, 41 R

[56] References Cited

U.S. PATENT DOCUMENTS

| | | |
|---|---|---|
| Re. 33,091 | 10/1989 | Schlosser . |
| D. 280,282 | 8/1985 | Erbach . |
| D. 293,191 | 12/1987 | Stephen et al. . |
| D. 322,909 | 1/1992 | Parent et al. . |
| D. 325,316 | 4/1992 | Parent et al. . |
| D. 325,318 | 4/1992 | Parent et al. . |
| D. 327,805 | 7/1992 | Parent et al. . |
| 2,886,386 | 5/1959 | Spitzer . |
| 3,611,915 | 10/1971 | Glaser .................................. 99/446 |
| 3,714,937 | 2/1973 | Linstead ............................ 126/25 R |
| 3,734,076 | 5/1973 | Kiziol ................................ 126/25 R |
| 3,785,275 | 1/1974 | Keats et al. ........................... 99/446 |
| 3,807,380 | 4/1974 | Pasiu . |
| 4,337,751 | 7/1982 | Sampson et al. . |
| 4,390,002 | 6/1983 | Daily, III ............................ 126/25 R |
| 4,416,248 | 11/1983 | Schlosser . |
| 4,453,530 | 6/1984 | Schlosser ............................. 126/25 R |
| 4,458,585 | 7/1984 | Erbach . |
| 4,498,452 | 2/1985 | Schlosser et al. . |
| 4,523,574 | 6/1985 | Schlosser ............................. 126/41 R |
| 4,576,140 | 3/1986 | Schlosser . |
| 4,587,947 | 5/1986 | Tomita . |
| 4,635,613 | 1/1987 | Tucker et al. ........................... 126/30 |
| 4,677,964 | 7/1987 | Lohmeyer et al. . |
| 4,762,114 | 8/1988 | Blankemeyer . |
| 4,777,927 | 10/1988 | Stephek et al. . |
| 4,788,906 | 12/1988 | Starks ................................... 99/450 |
| 4,895,134 | 1/1990 | Fielding et al. . |
| 4,966,125 | 10/1990 | Stephen et al. . |
| 5,016,607 | 5/1991 | Doolittle et al. ...................... 126/41 R |
| 5,036,832 | 8/1991 | Schlosser et al. . |
| 5,154,159 | 10/1992 | Knafele et al. ....................... 126/25 R |
| 5,165,385 | 11/1992 | Doolittle et al. ...................... 99/449 |

Primary Examiner—Timothy F. Simone
Attorney, Agent, or Firm—Middleton & Reutlinger; David W. Carrithers

[57] ABSTRACT

A barbecue grill assembly is disclosed including a bowl and domed, free-standing lid mating with each other to form a three-dimensional oval in combination a support assembly being provided for the bowl in the form of a integral shelf lid holder or brackets mounted on a portion of the barbecue grill assembly in spaced apart relation less than a corresponding dimension of the lid with extended surfaces and stops for causing the lid to move horizontally along the extended bracket surfaces and then rotate into a generally vertical position in cradled engagement with the brackets or integral shelf lid holders, an ash collector unit including vent means being suspended beneath a central portion of the bowl, and an ash sweep assembly to for cleanup of the ashes.

5 Claims, 15 Drawing Sheets

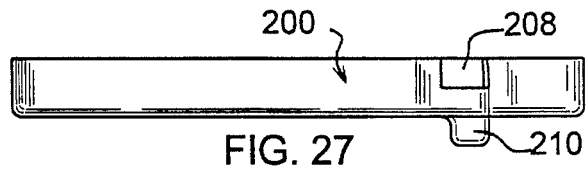
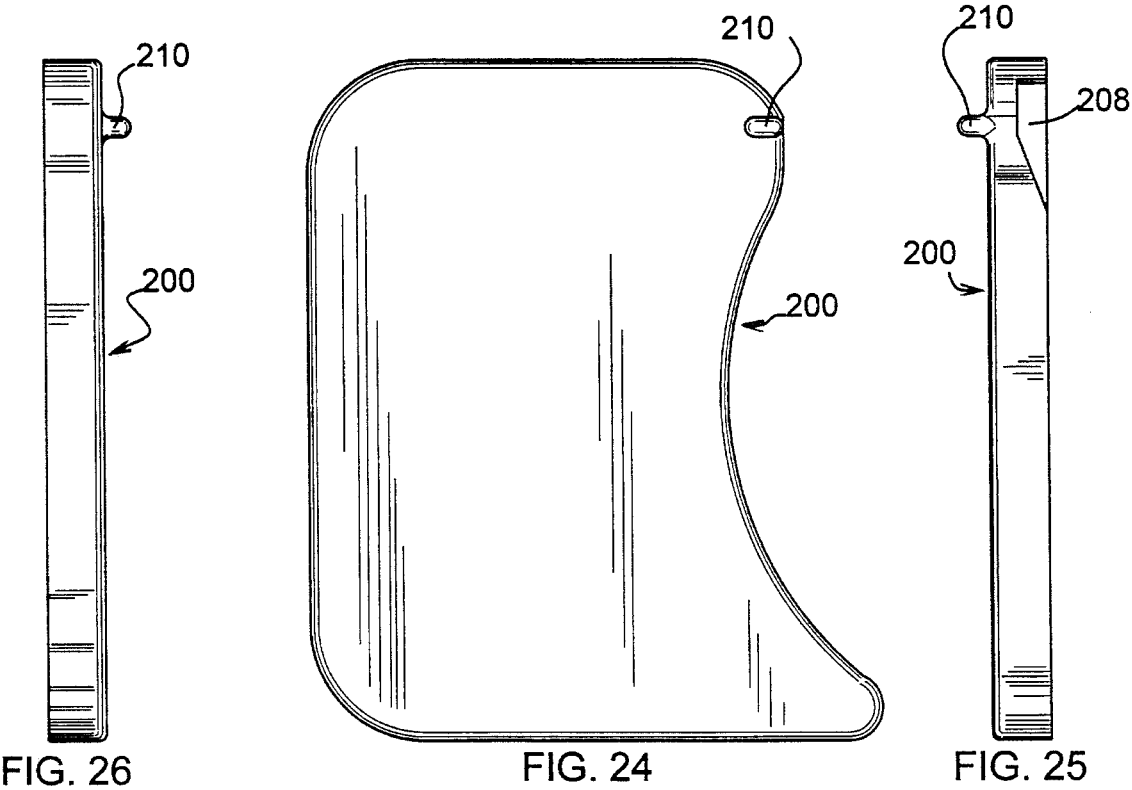
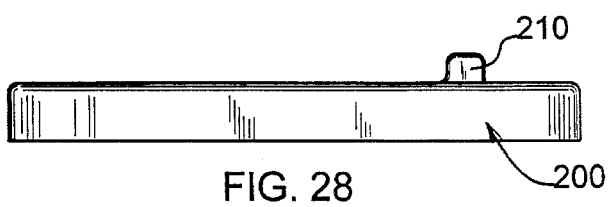

BARBEQUE GRILL WITH ASH SWEEP AND INTEGRAL SHELF LID HOLDER

FIELD OF THE INVENTION

The present invention relates to a barbecue grill assembly for cooking foods and more particularly to a portable barbecue assembly adapted for use with particulate fuel such as charcoal briquettes.

BACKGROUND OF THE INVENTION

A wide variety of barbecue grill assemblies have been provided in the prior art for use either with particulate fuels such as charcoal briquettes or liquid fuel.

Many of these barbecue grill assemblies are mounted wheels to make them portable and facilitate their movement from one location to another, often in outdoor areas of the home.

Such barbecue grill assemblies typically include a bowl-like base mounted on a suitable support such as a central pedestal or legs including wheels to make the unit portable as noted above. Where the barbecue unit is contemplated for use with charcoal briquettes, a cooking grill is normally mounted in the bowl above a fuel grill for receiving the briquettes.

The barbecue units commonly have an enclosure formed between the bowl and a dome-shaped lid with vents regulating the flow of air or oxygen through the interior to adjust the rate of burning of the briquettes. Operation is further enhanced by providing a accessories such as shelves for receiving food containers or cooking utensils. In addition, much of the prior art is directed toward arrangements for facilitating movement of the lid by a user in order to maintain the lid in open position upon the bowl and allow the user to add food to the cooking grill, rotate food articles already on the grill, replace or add charcoal briquettes or the like.

Representative barbecue grill assemblies of the type referred to above have been disclosed for example U.S. Pat. No. 3,611,915 issued Oct. 12, 1971 to Glaser; U.S. Pat. No. 3,689,758 issued Sep. 5, 1972 to Stephen, Jr.; U.S. Pat. No. 3,714,937 issued Feb. 6, 1973 to Lindstead; U.S. Pat. No. 3,734,076 issued May 22, 1973 to Kiziol; U.S. Pat. No. 4,390,002 issued Jun. 29, 1983 to Daily, III; U.S. Pat. No. 4,453,530 issued Jun. 12, 1994 to Schlosser; and U.S. Pat. No. 4,523,574 issued Jun. 18, 1985 also to Schlosser; U.S. Pat. No. 4,635,613 issue Jan. 13, 1987 to Tucker, et al. discloses a barbecue grill with a lid support means comprising clips mounted to a support structure away from the grill. However, it appears necessary for a user to first lift the lid and then insert it into a supported position on the clips.

The examples noted above are merely representative of barbecue assemblies available in the prior art and generally corresponding to the above described features.

The variety of barbecue grill assemblies available in the prior art is indicative of the widespread use and popularity of such units particularly for home or family use. However, there has been found to remain a need for further improvements in the units, particularly for facilitating their use under a wide variety of conditions and to allow the user to employ individual skills or techniques in the preparation of various foods.

SUMMARY OF THE INVENTION

It is therefore in object of the invention to provide an improved barbecue grill assembly capable of further enhancing cooking techniques of various individuals by constructing the barbecue grill assembly to facilitate its use while allowing the user to properly regulate cooking conditions within the unit.

It is a more specific object of the invention to provide such a barbecue assembly including a bowl and domed, free standing lid mating with each other and having a curved configuration at their intersection and cradle means for allowing a user to open the lid in a normal manner, the cradle means including either a pair of integral shelf lid holders attachable to the assembly on either side of the grill, or two brackets having extended surfaces facing each other and spaced apart less than a corresponding dimension of the lid with stop means formed on end portions of the extended surfaces whereby lifting of the lid causes the lid to move horizontally along the extended bracket surfaces and then rotate into a generally vertical position upon engagement with the stop means with the lid being cradled by the extended bracket surfaces and stop means in combination. The brackets are mounted upon a portion of the barbecue grill assembly, either attached directly to the bowl or to a portion of the support assembly for the bowl.

Preferably, the bowl and lid have a three-dimensional oval configuration with elliptical openings at their mating intersection, the three-dimensional configuration of the bowl and lid in combination corresponding to rotation of the ellipse about its longitudinal axis. As will be described in greater detail below. The three-dimensional configuration of the bowl and lid combination is believed to be aesthetically pleasing while also being utilitarian, particularly when the unit is adapted for use with particulate fuels such as briquettes in that briquettes can be arranged more uniformly beneath substantially the entire cooking area of the cooking surface. In addition, the cooking surface of the cooling grill is enlarged laterally, allowing for cooking of larger or more irregular food shapes.

The barbecue grill assembly is more preferably of a type including a support structure including a shelf forming an opening for receiving the bowl as a drop-in unit as further set forth in U.S. Pat. No. 5,016,607 by Doolittle et al. hereby incorporated by reference.

The barbecue assembly also preferably includes a cooking grill and fuel grill adapted to be supported in a spaced apart relation within the bowl. Preferably, the bowl and lid as well as the cooking grill and fuel grill are elliptically shaped. The cooking grill is more preferably formed with a hinged center portion which may be raised, for example, to adjust or add fuel on the fuel grill or after cooking to sweep the ashes into the ash collector.

It is yet another object of the present invention to provide a barbecue grill assembly of the type generally referred to above, preferably with a support structure for the bowl which permits access below a central portion of the bowl for an ash sweep and collector assembly. Preferably the ash collector includes a vertically arranged tubular element including adjustable means and self-cleaning attachment means beneath the tubular element for releasably securing an ash collector tray in place thereunder.

The ash sweep assembly is adapted to fit below the fuel rack and above the ash collector and includes a steel wire or rod rack formed having a pair of inwardly curving rods forming a elliptical central sweeping section having connecting rods thereinbetween and a central rod extending perpendicular with respect to the central sweeping section forming a handle. The entire ash sweeping assembly is dished to be complementary shaped to the curved surface of the elliptically shaped grill.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 24 is a top plan view of a left side shelf lid holder for a barbecue grill, the right side shelf lid holder being a mirror thereof;

FIG. 25 is a right side elevational view of FIG. 24;

FIG. 26 is a left side elevational view of FIG. 24;

FIG. 27 is a rear elevational view of FIG. 24;

FIG. 28 is a front elevational view of FIG. 24;

SPECIFICATION

The portable grill of the present invention is manufactured from readily available materials and simple in design. The preferred embodiment is comprised of metal, more particularly components formed from steel and porcelain coated steel; however, it is contemplated that copper, aluminum, stainless steel, or other metal alloys can be used with or without porcelain coating and in combination with or substituted for the porcelain coated metal components of the present invention.

Figure 1:
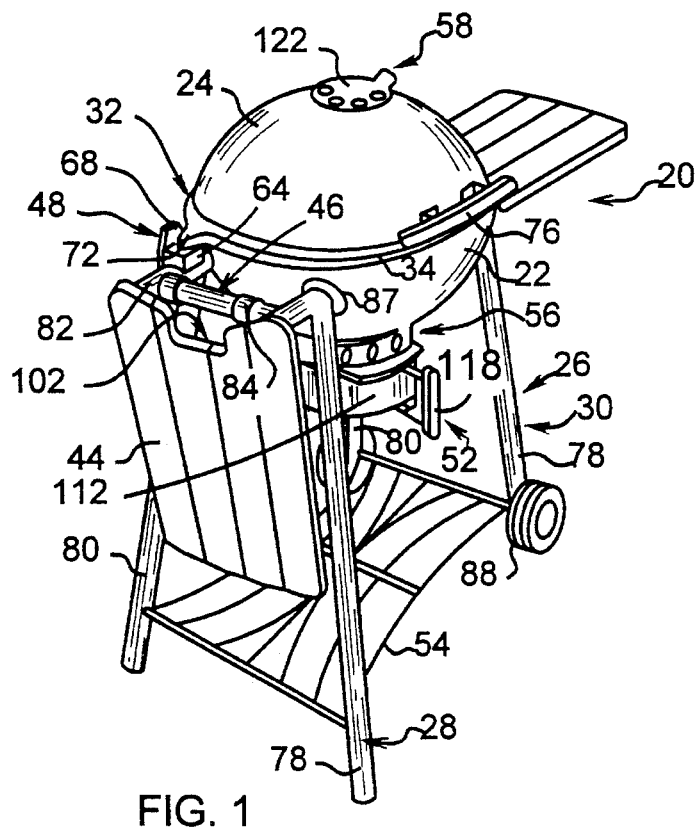
FIG. 1 is a pictorial representation of a barbecue grill assembly constructed according to the present invention with a bowl and domed, free-standing lid forming a three-dimensional oval configuration, a movable shelf on the other leg assembly is illustrated in a vertical suspended position.

Referring now to the drawings and particularly to FIG. 1, a barbecue grill assembly constructed according to the present invention is generally indicated at 20 and includes a bowl-like member 22 and mating, domed free-standing lid 24. The bowl 22 is mounted on a support structure 26 including leg assemblies 28 and 30 preferably arranged at opposite ends os the bowl 22.

The bowl 22 and lid 24 intersect at 32 with the lid 24 having a slightly larger flanged edge 34 to fit over a mating flanged edge 36 on the bowl 22. The flanged edge 34 of the lid 24 is illustrated in FIGS. 1 and 2 with the flanged edge 36 of the bowl 24 being illustrated best in FIG. 3.

Figure 2:
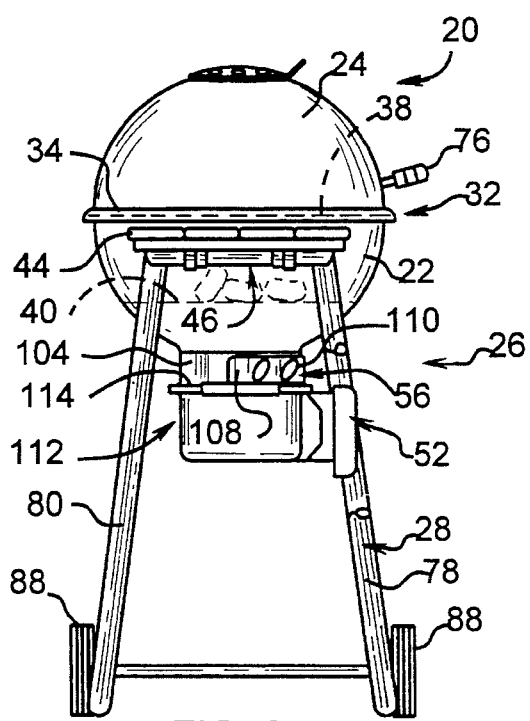
FIG. 2 is a side view of the barbecue grill assembly of FIG. 1, in order to better illustrate the three-dimensional configuration of the bowl and lid in combination.
Figure 3:
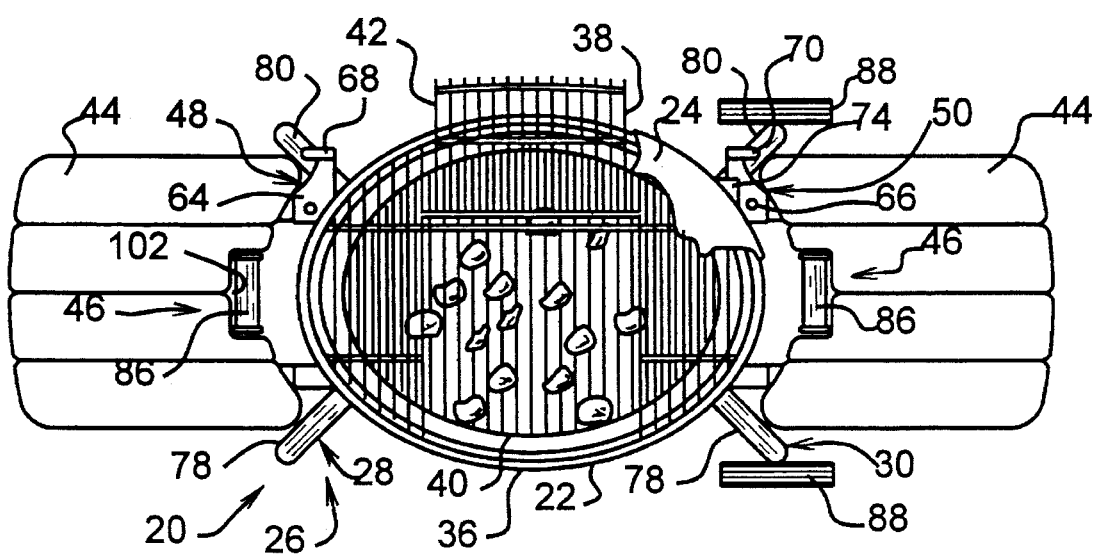
FIG. 3 is a top view of the barbecue grill assembly generally illustrating the elliptically configured opening for both the bowl and lid at their intersection.

FIG. 3 also shows the intersecting opening or openings 32 for the bowl 22 and lid 24 are curved and preferably have an elliptical configuration both to enhance appearance of the barbecue grill assembly and also to facilitate cooking of food in the grill assembly 20. Referring particularly to FIGS. 1 and 2, the bowl 22 and lid 24 have a three-dimensional shape combination corresponding to rotation of the elliptical opening 32 about its longitudinal axis.

Figure 14:
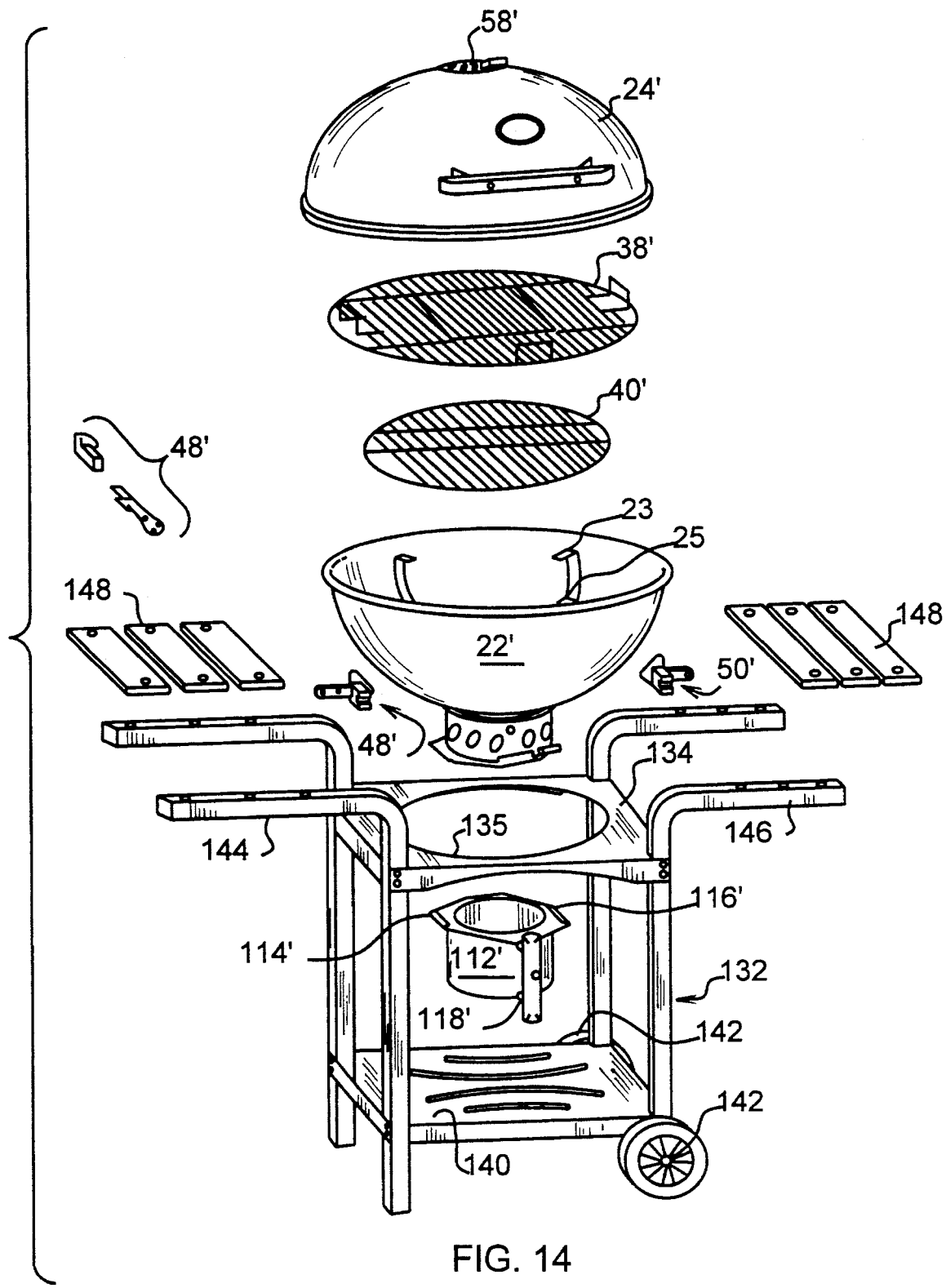
FIG. 14 is an exploded view in perspective of the barbecue grill assembly depicted in FIG. 13.

Referring in combination to FIGS. 2, 3, and 14 a food grill 38 is arranged in the bowl 22 on brackets 23 above a lower grill 40 supported by brackets 25 for receiving particular fuels such as charcoal briquettes.

As may be seen in both FIGS. 2 and 3, the elliptical three-dimensional configuration of the bowl 22 permits the fuel grill 40 to extend almost entirely beneath the upper food grill 38, particularly a central cooking area most often used in such barbecue grill assemblies. The upper food grill 38 is also formed with a hinged portion 42 in the central cooking portion of the grill. Accordingly, a user may move food products away from the hinged grill portion 42 and then raise that portion of the grill in order to adjust charcoal briquettes or add additional briquettes as necessary without substantially disturbing the cooking food on the upper grill 38.

Additional features of the barbecue grill assembly 20 are summarized immediately below and described in greater detail thereafter. Initially, the leg assemblies 28 and 30 are each formed as relatively unitary structures from tubular metal and serve a combined function of supporting the bowl 22, mounting a movable shelf 44 as supporting the bowl 22, mounting a movable shelf 44 as well as a handle 46. The movable shelf 44 and handle 46 could be arranged on only one of the leg assemblies if desired.

In addition, the two leg assemblies 28 and 30 additionally mount cradle brackets 48 and 50 which support the lid 24 on the bowl 22 when the lid 24 is opened by the user.

With the leg assemblies 28 and 30 arranged at opposite ends of the bowl 22, an ash collector assembly 52 is suspended from a central portion of the bowl 22 for receiving ashes from consumed briquettes or other fuel in the bowl 22.

The construction of the leg assemblies 28 and 30 is even more preferably selected for facilitating mounting of the leg assemblies on curved surfaces of the bowl 22. An additional structural members for linking the legs assemblies 28 and 30 together, such as a wire shelf 54, is interconnected with the lower ends of the leg assemblies 28 and 30 remote from the bowl 22 in order to further enhance structural rigidity of the leg assemblies in combination with the bowl 22. Without the wire shelf 54, weight on an oval or elliptical bowl could cause the leg assemblies 28 to shift or spread, resulting distortion of the bowl 22. This is prevented by the wire shelf which acts in tension to prevent spreading of the leg assemblies or distortion of the bowl 22.

The ash collector assembly 52 also includes a novel vent assembly 56 and ash sweep assembly described in greater detail below. Another vent 58 is arranged on a central portion of the lid 24. Both of the vent assemblies 56 and 58 are adjustable in order to regulate the amount of air or oxygen passing through the interior of the bowl 22 and lid 24 in order to control burning of briquettes therein.

The components of the barbecue grill assembly as summarized above are described in greater detail below.

Figure 8:
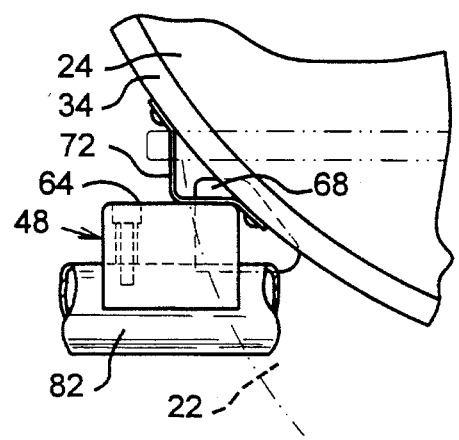
FIG. 8 is a view taken along section line VIII—VIII of FIG. 7 to better illustrate a rounded or beveled extended surface on the bracket and positioning of guide.

The cradle brackets 48 and 50 are positioned in fixed relation to the bowl 22 and lid 24, preferably be being mounted on a portion of the barbecue grill assembly. In the embodiments illustrated in FIGS. 1–12, the cradle 48 and 50 are mounted on or attached to a portion of the support structure 26 for the bowl 22. As described in greater detail herein, the brackets 48 and 50 are mounted on the leg assemblies. However, referring particularly to the embodiment of FIG. 13, the brackets 48' and 50' could for example be mounted on the shelf 134 for supporting the bowl 22. For instance, in the embodiments of FIGS. 15–18, one of the brackets indicated at 48" is attached directly to the bowl 22". The cradle brackets 48 and 50 are positioned upon the respective leg assemblies 28 and 30 so that the extended surfaces 60 are fixed apart from each other by a distance somewhat less than a corresponding dimension of the bowl and lid as may be best seen in FIG. 3. The surfaces 60 and 62 are preferably rounded or beveled as illustrated in FIG. 8 while being arranged slightly beneath the flanged edge 34 of the lid when the lid 24 is normally positioned upon the bowl 22 as illustrated in FIGS. 1 and 2.

Each of the cradle brackets 48 and 50 is also formed with a top surface 64 or 66 for engaging guide projections on the lid 24 as described in greater detail below. Projecting stops 68 and 70 are arranged or formed on the extended ends of the cradle brackets 48 and 50 to further facilitate cradling of the lid 24 on the brackets.

The guide projections 72, 74 referred to above are mounted on the flanged edge 34 of the lid 24 for engaging the upper or top surfaces 64 and 66 respectively of the cradle brackets 48 and 50 in order to better assure that the lid 24 remains in proper alignment with cradle brackets 48 and 50. However, the guide projections 72 and 74 could also be integrally formed by the flanged edge 34.

The cradle brackets 48 and 50 are also arrange don a side portion or back of the bowl 22 opposite a handle 76 on the lid 24. In operation, when a user wishes to open the barbecue grill assembly, he normally grasps the handle 76 and raises it toward an initial position illustrated in FIG. 4 with the lid flange 34 and guide projections 72 and 74 respectively engaging the extended surfaces 58, 60 and the upper surfaces 64, 66 on the cradle brackets 48 and 50.

Figure 4:
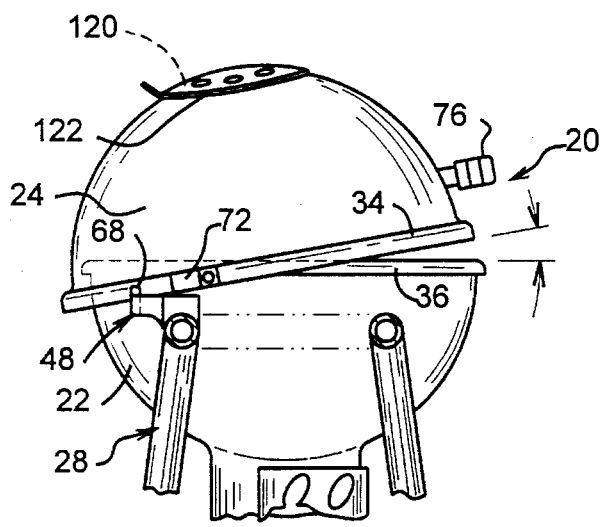
FIG. 4 is a partial side view of the barbecue grill assembly with the lid partially open to illustrate its initial engagement with the cradling brackets.
Figure 5:
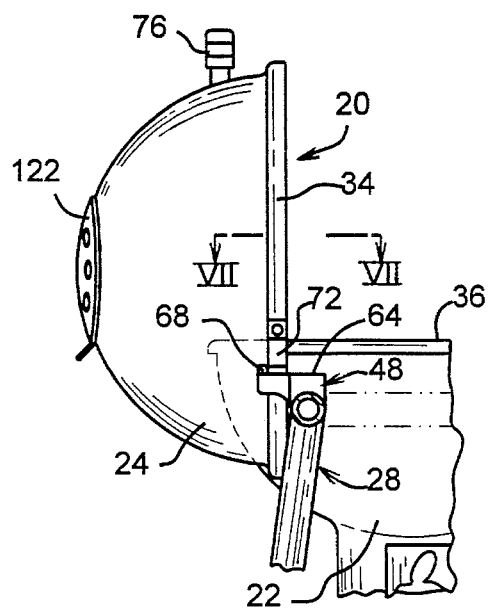
FIG. 5 is a view similar to FIG. 4 but with the lid fully open and cradled on the brackets.
Figure 6:
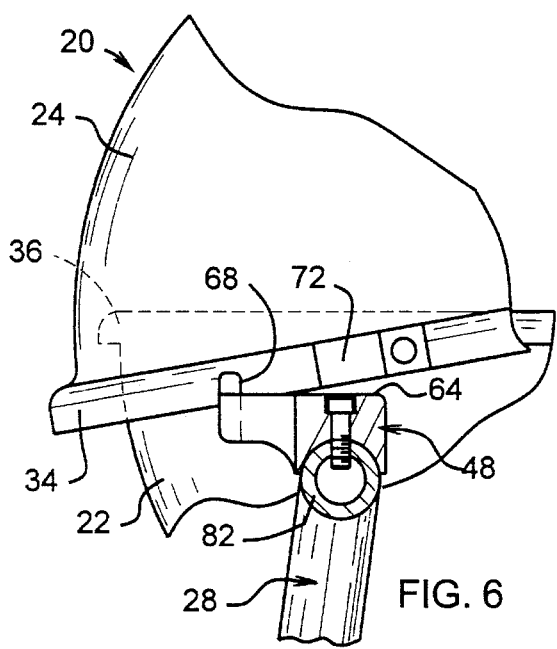
FIG. 6 is an enlarged fragmentary view, similar to FIG. 2, illustrating one of the brackets with the lid partially open as in FIG. 4.
Figure 7:
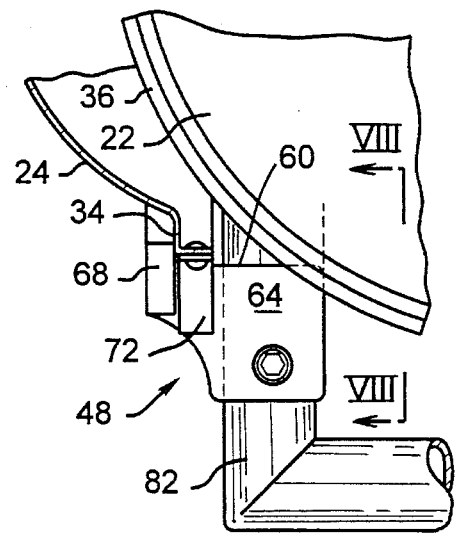
FIG. 7 is a view taken along section lines VII—VII in FIG. 5 to provide a detailed top view of the bracket.

As the user continues to raise the lid from the position illustrated in FIG. 4 toward the open position in FIG. 5 the flanged edge 34 on the lid 24 tends to slide along the extended surfaces 60 and 62 of the cradle brackets until it engages the projecting stops 68 and 70. The lid 24 is then positioned generally vertically with the entire interior of the bowl 22 being exposed as illustrated in FIG. 5. At the same time, the extended edge 34 of the lid 24 is cradled between the extended surfaces 60, 62 and the projecting stops 68 and 70 on the cradle brackets 48 and 50. A portion of the lid flange 34, opposite the handle 76, rests against the bowl 22 when the lid 24 is in its open or vertical position.

During movement of the lid 24 from the closed position of FIG. 2 through the partially open position of FIG. 4 and into the fully opened position in FIG. 5, the guide projections 72 and 74 remain engaged with the upper surfaces 64 and 66 of the cradle brackets 48 and 50 so that the lid remains in properly cradled orientation with the brackets 48 and 50.

The cradle brackets 48 and 50 ar preferably formed or cast, for example, from a suitable heat resistant material such as a plastic or the like. The bracket material is sufficiently resilient to avoid scratching or marking the metal surface of the lid 24. As may be seen in FIGS. 4–6, each of the cradle brackets 48 and 50 is formed with an arcuate depression for receiving a respective tubular portion of the leg assembly 28 or 30 upon which it is positioned.

At least one and preferably both of the leg assemblies 28 and 30 additionally provide support mounting for a movable shelf 44 and handle 46. Since the two leg assemblies 28 and 30 are of generally similar but mirror image constructions, only the leg assembly 28 is describe below with the other leg assembly 30 including similar components.

Figure 9:
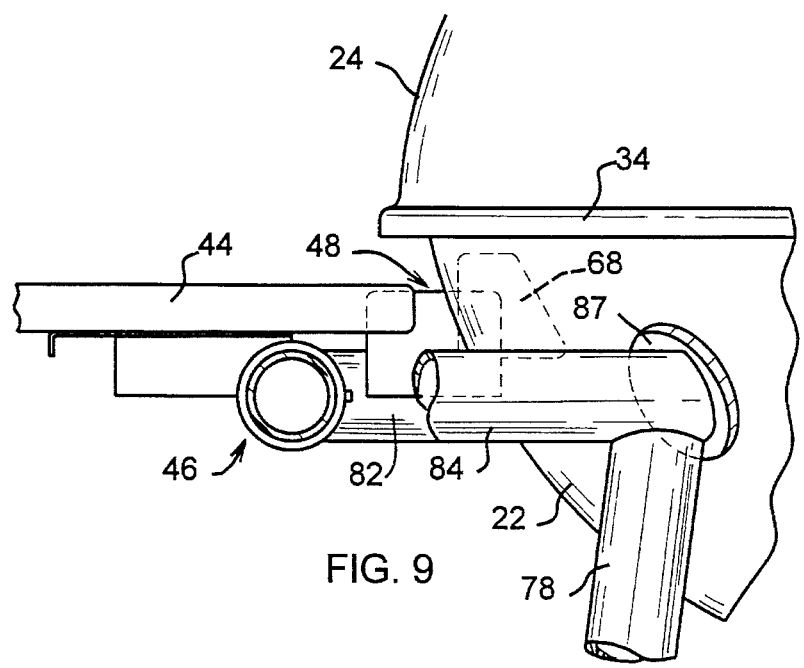
FIG. 9 is a fragmentary view of one leg assembly with the corresponding shelf being in its erect position.
Figure 10:
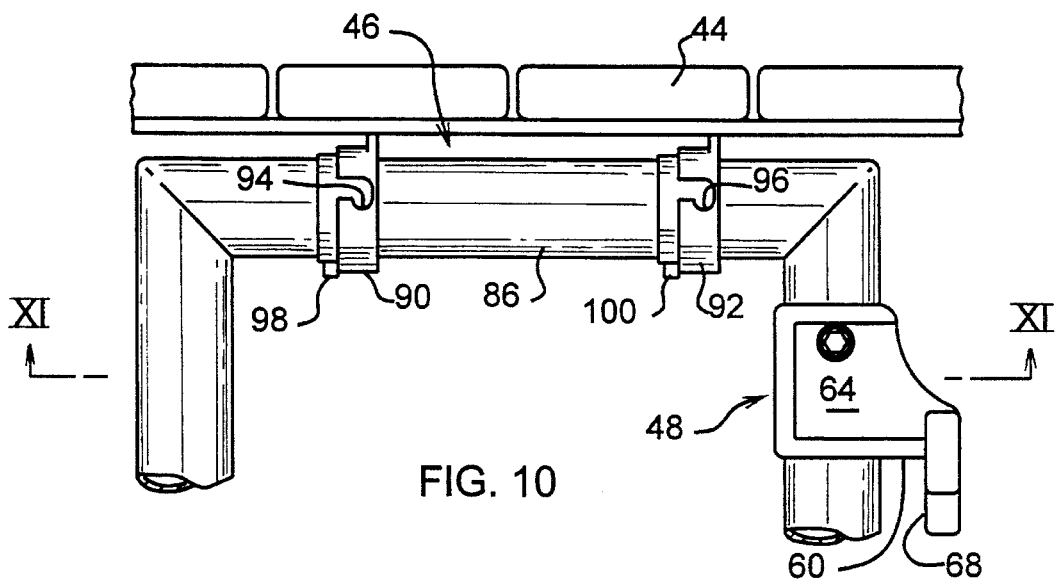
FIG. 10 is a top view corresponding to FIG. 9 while illustrating the handle, shelf and bracket being mounted on one leg assembly with the shelf in its vertical suspended position.
Figure 11:
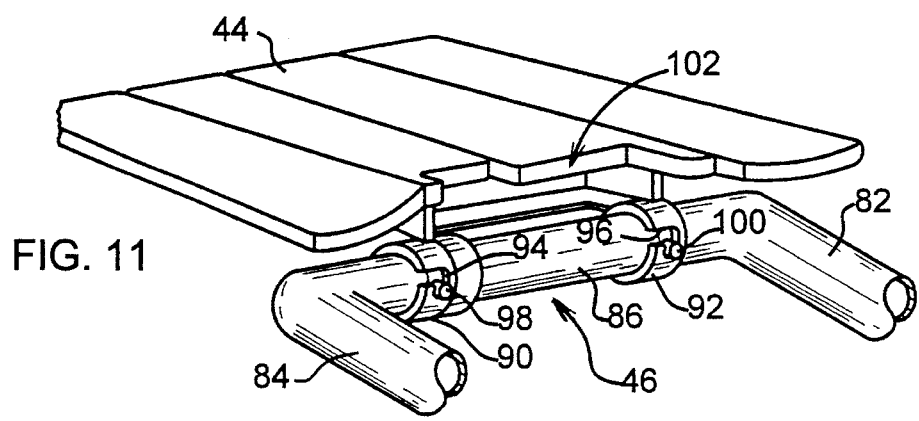
FIG. 11 is a pictorial fragmentary view of the leg assembly of FIGS. 9 and 10 wile illustrating slot and pin combinations for movably positioning the shelf.

Referring particularly to FIGS. 9–11, the leg assembly 28 is formed from structural tubing to include front and back legs 78 and 80 respectively. In addition, tubular portions 82 and 84 of the leg assembly are arranged in coaxial relation to each other, adjacent the end of the bowl 22, for receiving a cylindrical handle 86 therebetween. Preferably, the handle 86 is formed from a material such as wood with poor heat transfer characteristics in order to permit moving of the barbecue grill assembly 20 during use.

The leg assemblies are secured to the bowl 22 by saddles 87 which are shaped to generally conform to the curves surface of the bowl 22. The saddles are preferably welded to both the bowl 22 and leg assembly 28 or 30.

The leg assemblies 28 and 30 differ substantially only in the wheels 88 mounted beneath the legs 78 and 80 of the leg assembly 30.

The movable shelf 44 is formed from wood or heat resistant plastic and includes mounting brackets 90 and 92 which are rotatable and axially movable upon the tubular portions 82 and 84 of the leg assemblies. Referring particularly to FIG. 11, the rotary brackets 90 ad 92 are formed with curved slots 94 and 96 for receiving projecting pins 98 and 100 on the tubular portions 82 and 84 of the leg assembly. The movable shelf or tray 44 is also formed with a cutout 102 between the mounting brackets 90 92 and adjacent the handle 76.

With this arrangement, the cutout 102 in the tray leaves the handle 76 exposed with the shelf or tray 44 either in its erect position illustrated in FIG. 1 or its either in its erect position illustrated in Figure or its suspended position. At the same time, particularly with the shelf 44 in its suspended position as illustrated in FIG. 11, the slot and pin combinations 94, 98, 96, 100 are exposed to a user to clearly indicate how the shelf 44 can be moved to an erect position.

In that regard, it is only necessary to rotate the shelf so that the pins 98 and 100 are in lateral portions of the slots 94 and 96. The shelf may then be moved laterally for aligning the pins 98 and 100 with either the short vertical portions at one end of the respective slots or at the other end of the slots. With the pins in the short portions of the slots, the shelf 44 is maintained in its erect position illustrate in FIG. 1. With the pins 98 and 100 at the other ends of the slots, the shelf 44 is permitted to rotate downwardly to its suspended position illustrated in FIG. 11.

Figure 12:
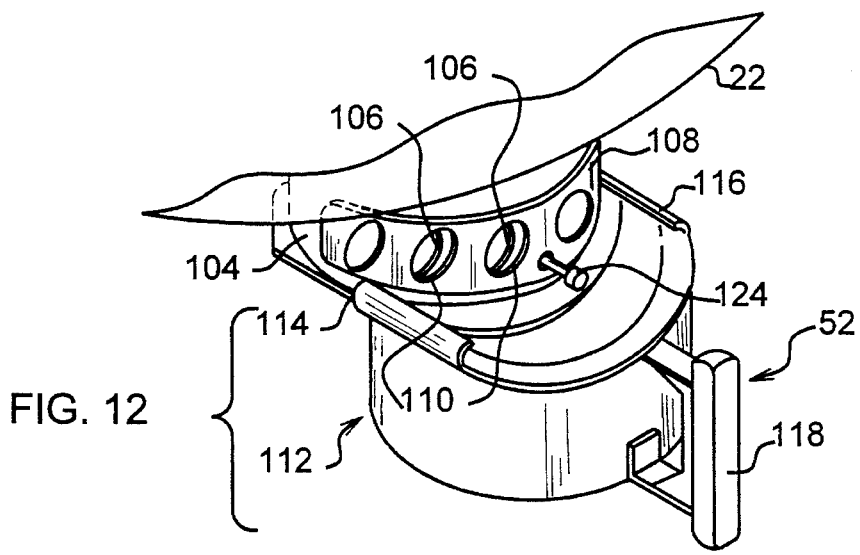
FIG. 12 is an enlarged fragmentary view of the ash collector with its vent collar rotated to a partially open position and the ash collector tray also in a partially open position.

Referring now to FIGS. 1 and 12, the ash collector assembly 52 includes a vertically extending tubular portion 104 formed with perforations 106. Preferably, the perforations 106 are inclined ellipses conforming to the overall configuration of the bowl 22 and lid 24 in combination. A collar 108 is movably mounted on the rounded portion 104 and includes similar perforations 110. Thus the collar 108 may be moved or rotated in order to adjust the opening of the vent assembly 56 or to move the perforation 106 and 110 out of register with each other to entirely close the vent assembly 56. For example, a tab can be used to laterally adjust the collar 108 with respect to the tubular portion 104 for opening and closing the vent assembly 56.

An ash collector tray 112 is mounted beneath the vertically extending tubular portion 104 by mating, self-cleaning flanges 114 and 116 respectively from the bottom of the vertically extending tubular portion 104 and on an upper edge of the ash collector tray 112. The ash collector tray 112 also has a handle 118 to facilitate retraction of the collector tray 112 from the self-cleaning flanges 114 in order to empty ashes therefrom.

This combination of the ash collector assembly 52 is particularly advantageous in that the vent assembly 56 is formed on a vertical surface of the tubular extension 104 substantially above the ash collector tray 112. Thus, the design of the ash collector assembly 52 assures that the vent assembly 56 is not plugged and made inoperable by ashes collecting from the bowl 22.

The present invention also includes an ash sweep assembly 300 as shown best in FIGS. 31–35, adapted to fit below the fuel grill 40 and above the ash collector 52. The preferred embodiment is comprised of chromed steel for durability and aesthetic appeal; however it is contemplated that any metal could be used as a material of construction. The ash sweep 300 includes a steel wire or rod rack main body portion 302 formed having a pair of inwardly curving sweeping rods, a first outer sweeping rod 304 and a second inner sweeping rod 306 forming a generally elliptical central sweeping section 307. As shown, the preferred embodiment includes a long central connecting rod 308 extending perpendicular with respect to the sweeping rods 304, 306 having a distal end connected to the center of the outer sweeping rod 304 and extending outwardly pass the inner sweeping rod 306. The distal end of the central connecting rod 308 is looped forming a handle 310 for easy manipulation of the ash sweep 300 by the user. In the preferred embodiment, a pair of perpendicular connecting rods 312 join the sweep rods 304 and 306 providing structural strength, balance, and a means for breaking up ash deposits along the bottom of the bowl 22. The entire ash sweep 300 is dished shaped in that it is complementary sized and shaped with respect to the curved surface of the bottom of the elliptically shaped grill bowl 22.

When not in use the ash sweep 300, the sweeping section 307 rests on the underside of the charcoal or fuel grill 40. The ash sweep 300 is not required to remove ashes during the use of the present grill 20, such as described in conventional grills known in the art, for the venting system of the present grill 20 is arranged on the sides of the ash collector assembly 52 so as not to clog the vents 106, 110. The purpose of the ash sweep is to provide a convenient means of cleaning the grill bowl 22 after use. To use the ash sweep 300, the user merely pulls upward on the ring handle 310 upward between the edge of the fuel grill 40 and food grill 38 and the edge of the bowl 22. The ash sweeping section 307 and ashes are pulled across the ash collector 52 until the ash sweep section 307 is in contact with the fuel grill support bracket 25. The ash sweep 300 is then pushed back over the ash collector 52 until the sweeping section touches the fuel grill support bracket 25 on the opposite side of the grill bowl 22 and the handle 310 rests at the edge of the food grill 38 and the bowl 22. The procedure may be repeated as needed; however, usually one cycle will suffice. When not in use the ash sweep 300 rests in the bottom of the grill bowl 22 with the handle ring 310 nested between the food grill 38 and the bowl 22 so that the lid 24 may be closed without touching the handle 310. Only the central rod 308 covers any portion of the ash collector 52 during the cooking session, so as not to obstruct the flow of air upward from the vents 106, 110.

The other vent assembly 58, arranged above the lid 24, is similarly adjustable for regulating air flow through the barbecue grill assembly. Because of the elliptical configuration of the lid, vent openings in the lid 24 itself are formed on a hemispherical portion 120 on the lid 24. The vent assembly includes a similar hemispherically formed movable vent member 122, the lid portion 120 and the movable vent member 122 forming respective perforations similar to those described for the vent assembly 56 and operable in a similar manner to regulate air flow through the barbecue grill assembly.

Figure 13:
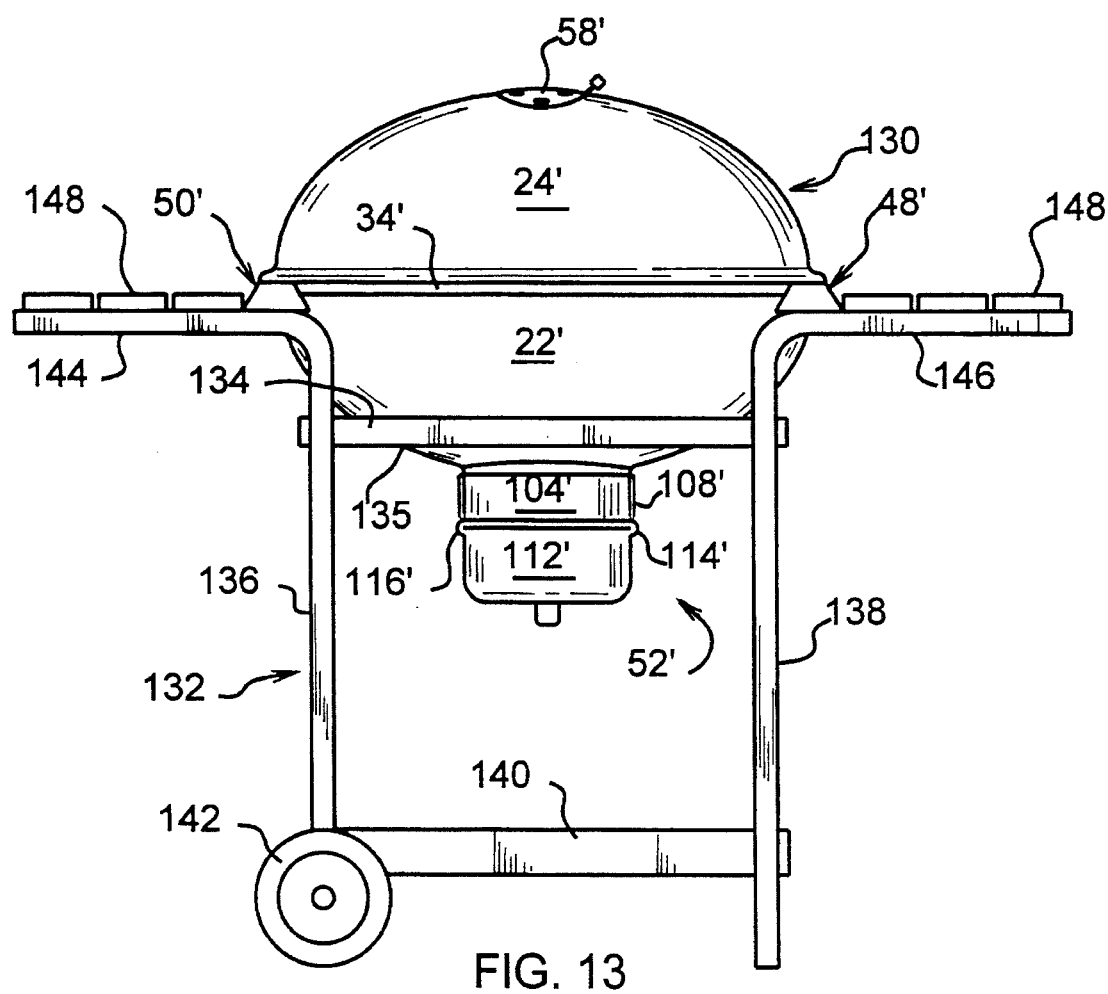
FIG. 13 is a front view of a barbecue grill assembly similar to that of FIGS. 1–12 but including a different support structure.

Another embodiment of a barbecue grill assembly constructed according to the invention is indicated at 130 in FIG. 13 and includes a substantially similar bowl, and other components as in FIGS. 1–12. The similar components are indicated by primed numerals corresponding to the numerals for the components in FIGS. 1–12.

The grill assembly 130 has a different support structure 132 also fabricated from tubular metal and having a central tray 134 suspended between unitary leg assemblies 136 and 138. The shelf 134 is cut out to form an opening 135 for receiving the bowl 22' as a drop-in unit. The support structure also has a lower structural shelf 140 and wheels, one being indicated at 142.

Laterally extending portions 144 and 146 on the support structure provide fixed mountings for shelves 48 at either end of the bowl 22 similarly as the shelves 44 of FIGS. 1–12.

The support structure 132 also provides open access below a central portion of the bowl 22' for suspending the ash collector assembly 52' similarly as in FIGS. 1–12.

The exploded view of FIG. 14 better illustrates features of construction of the various components of the grill assembly 130 of FIG. 13 while also better illustrating the interrelation of those components. For example, it may be clearly seen how the bowl 22' nests in the opening 135 of the shelf 134.

Figure 15:
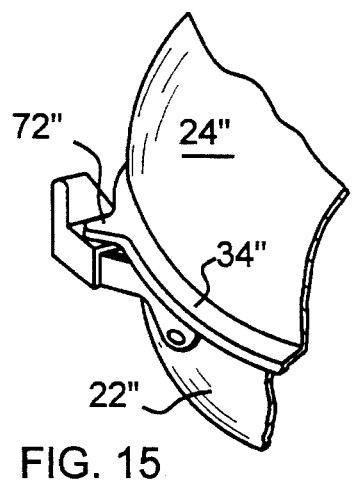
FIG. 15 is a fragmentary perspective view illustrating portions of the bowl and lid in another embodiment of the invention wherein the cradling brackets are mounted directly upon the bowl.
Figure 16:
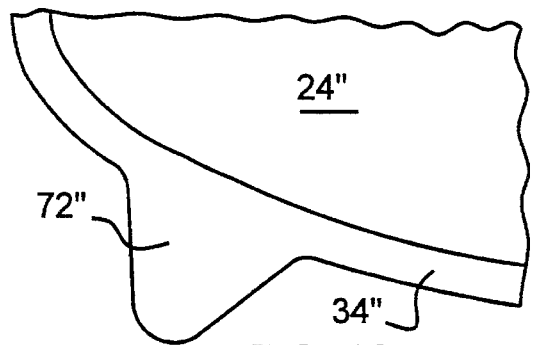
FIG. 16 is a fragmentary plan view of the lid alone illustrating one of a pair of guide projections being integrally formed by a flanged edge of the lid.

Still another embodiment of the barbecue grill assembly is illustrated in FIGS. 15–18. Referring to those figure, the guide projections 72" are preferably formed as an integral portion of the flanged edge 34" of the lid 24". One of the guide projections 72" is illustrated in FIGS. 15–16, the other guide projection 72" also being integrally formed by the flanged edge 34" of the lid 22".

Figure 17:
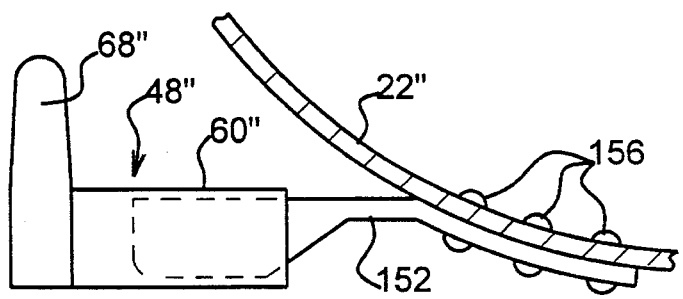
FIG. 17 is a fragmentary plan view of a corresponding portion of the bowl, with parts in section, to better illustrate one of the brackets mounted directly on the bowl.
Figure 18:
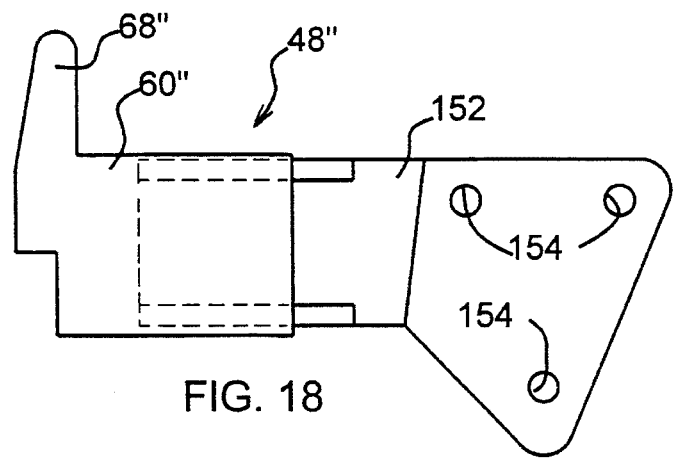
FIG. 18 is a side elevation view of a bracket adapted for direct attachment to the bowl taken from the bottom of FIG. 17.
Figure 19:
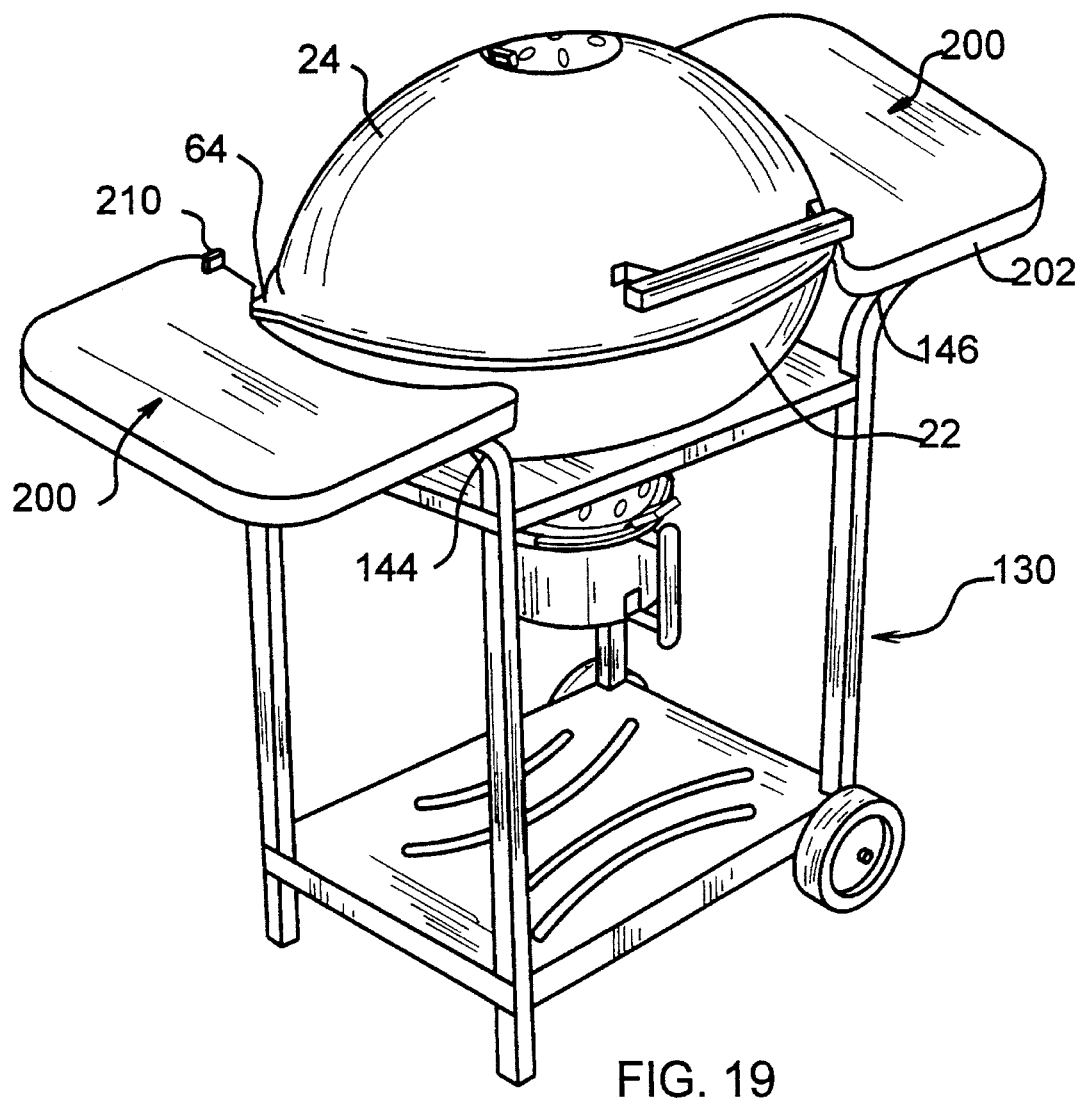
FIG. 19 is a front elevational view of the grill showing a pair of integral shelf lid holders.
Figure 20:
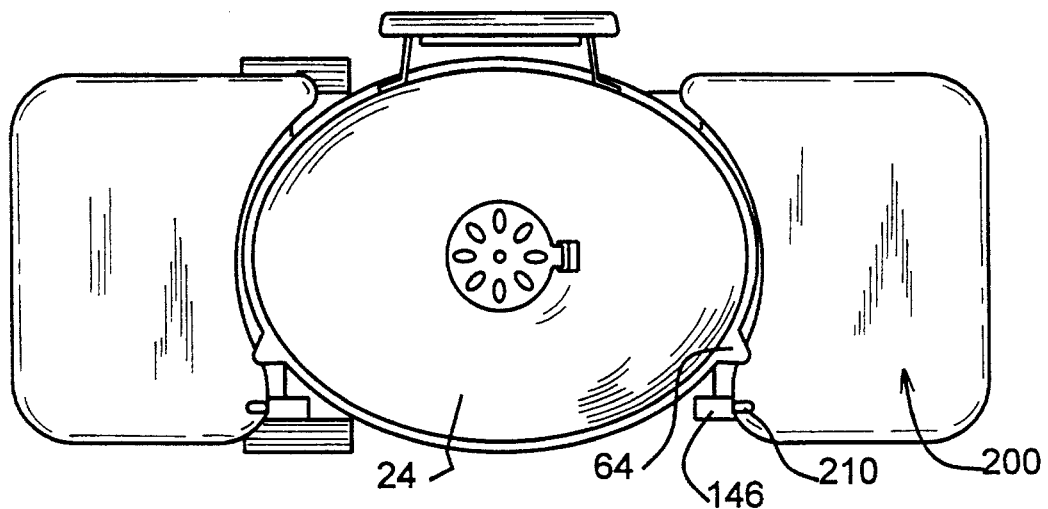
FIG. 20 is a top plan view of FIG. 19.
Figure 21:
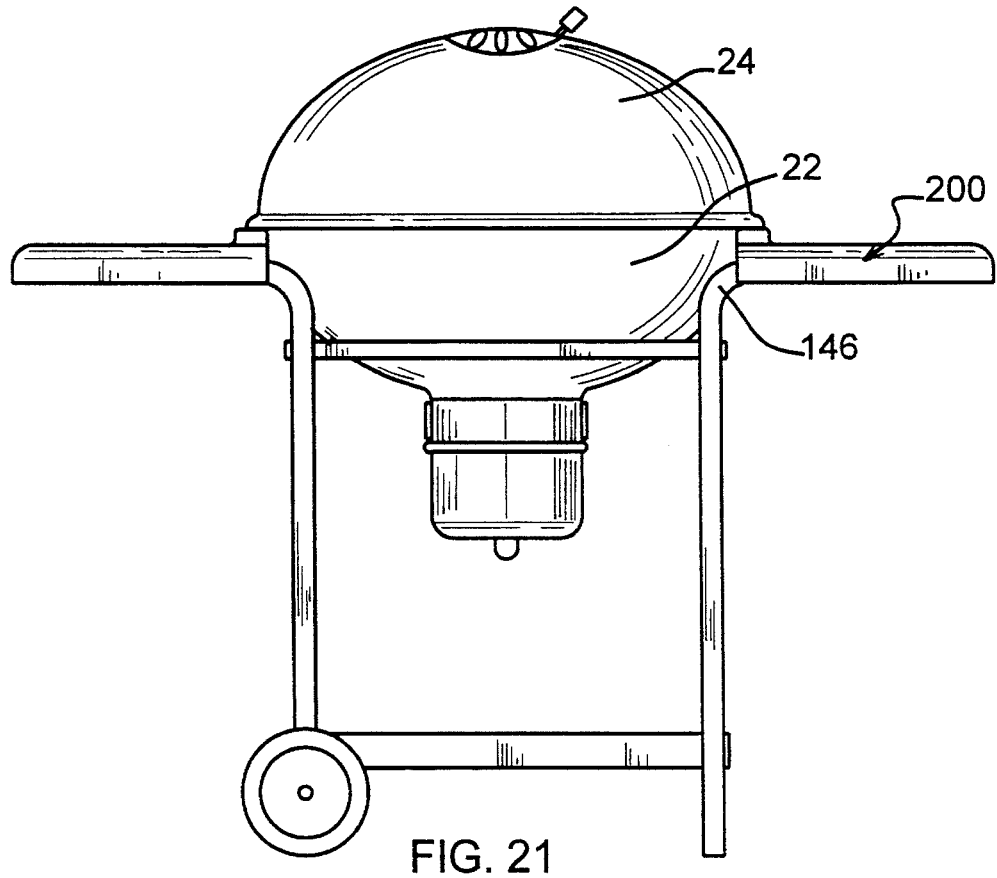
FIG. 21 is an elevational rear view of FIG. 19.
Figure 22:
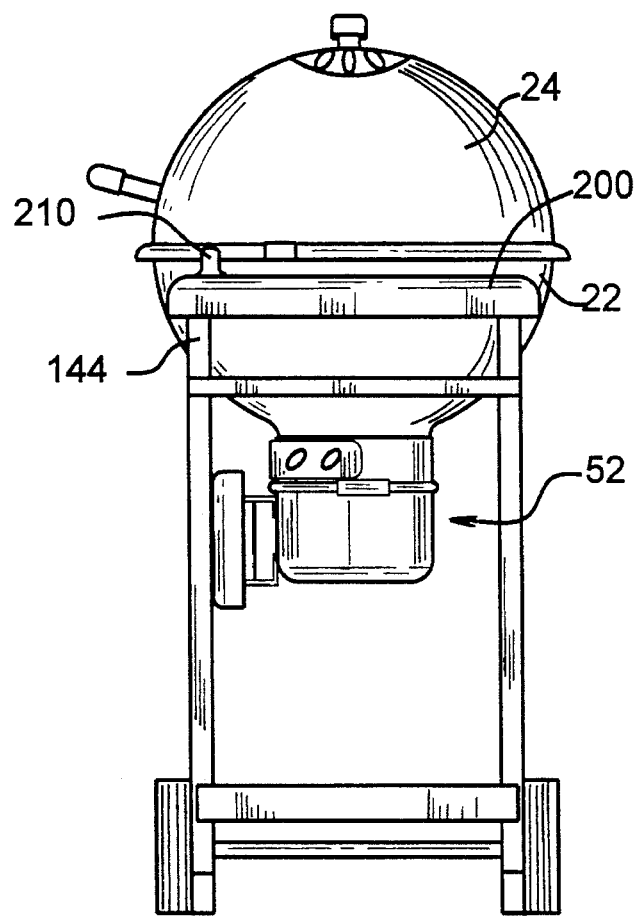
FIG. 22 is a left side view of FIG. 19, the right side view being a mirror image thereof.

Referring particularly to FIGS. 15, 17, and 18, the cradle brackets are preferably adapted for direct attachment to the bowl 22". One of the cradle brackets is indicated at 48". The bracket 48" is shaped substantially the same as the brackets 48 and 48' in FIGS. 1–13. However, the brackets 48" includes a metal shank 152 adapted for attachment to the bowl 22". Referring particularly to FIGS. 17 and 18, the metal shank 152 is formed with holes 154 so that the metal shank 152 and the bracket 48" may also be formed as an integral portion of the bowl 22" by conventional processes.

As shown in FIGS. 19–30, an integral shelf lid holder 200 is formed with a contemporary shape to fit closely to the bowl 24. Although the integral shelf lid holder 200 may be formed from metal, the preferred embodiment is comprised of a synthetic material, more particularly a thermoset polyester fiberglass reinforced plastic. The particular material is selected for the ease of moldability, weather ability, heat resistance, cleanability, light weight, and structural strength. The integral shelf lid holder 200 provides a means to mold a means for supporting the lid 24 into a solid shelf having a contoured contemporary shape at a reasonable cost.

Figure 23:
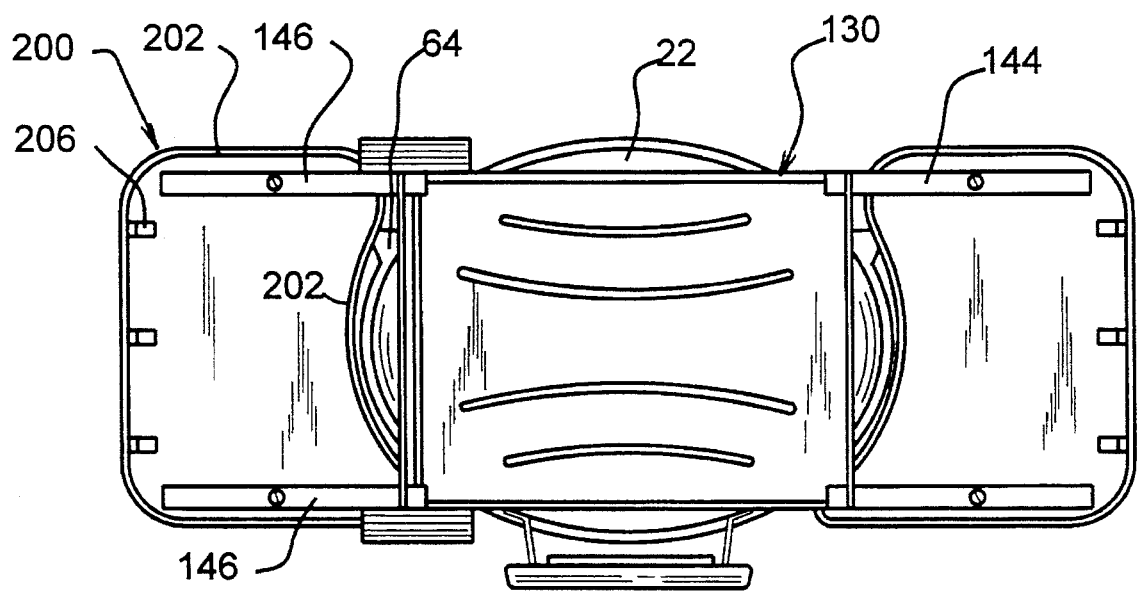
FIG. 23 is a bottom plan view of FIG. 19.
Figure 29:
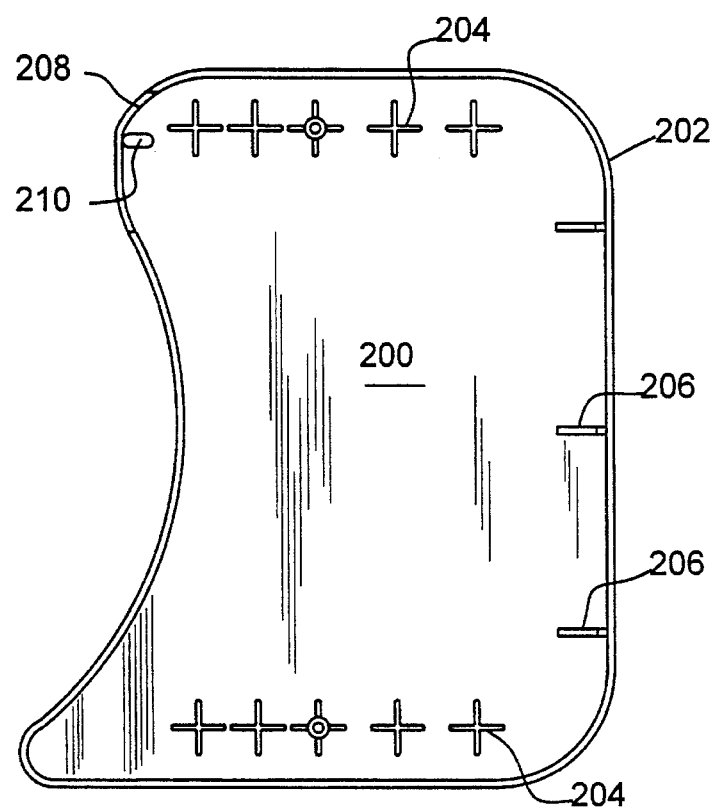
FIG. 29 is a bottom plan view of FIG. 24
Figure 30:
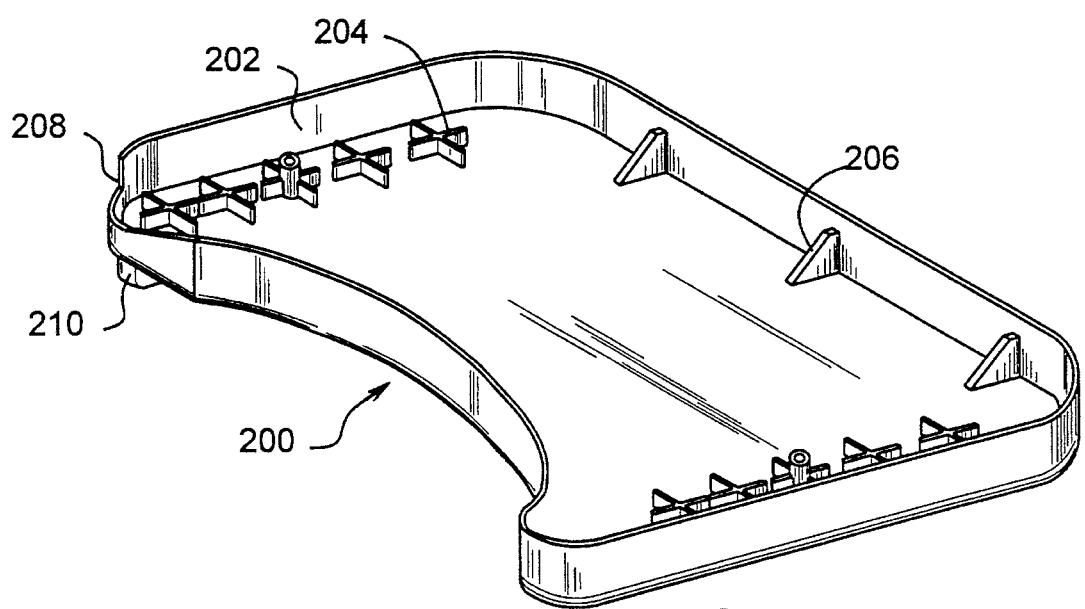
FIG. 30 is a bottom perspective view of FIG. 24.
Figure 31:
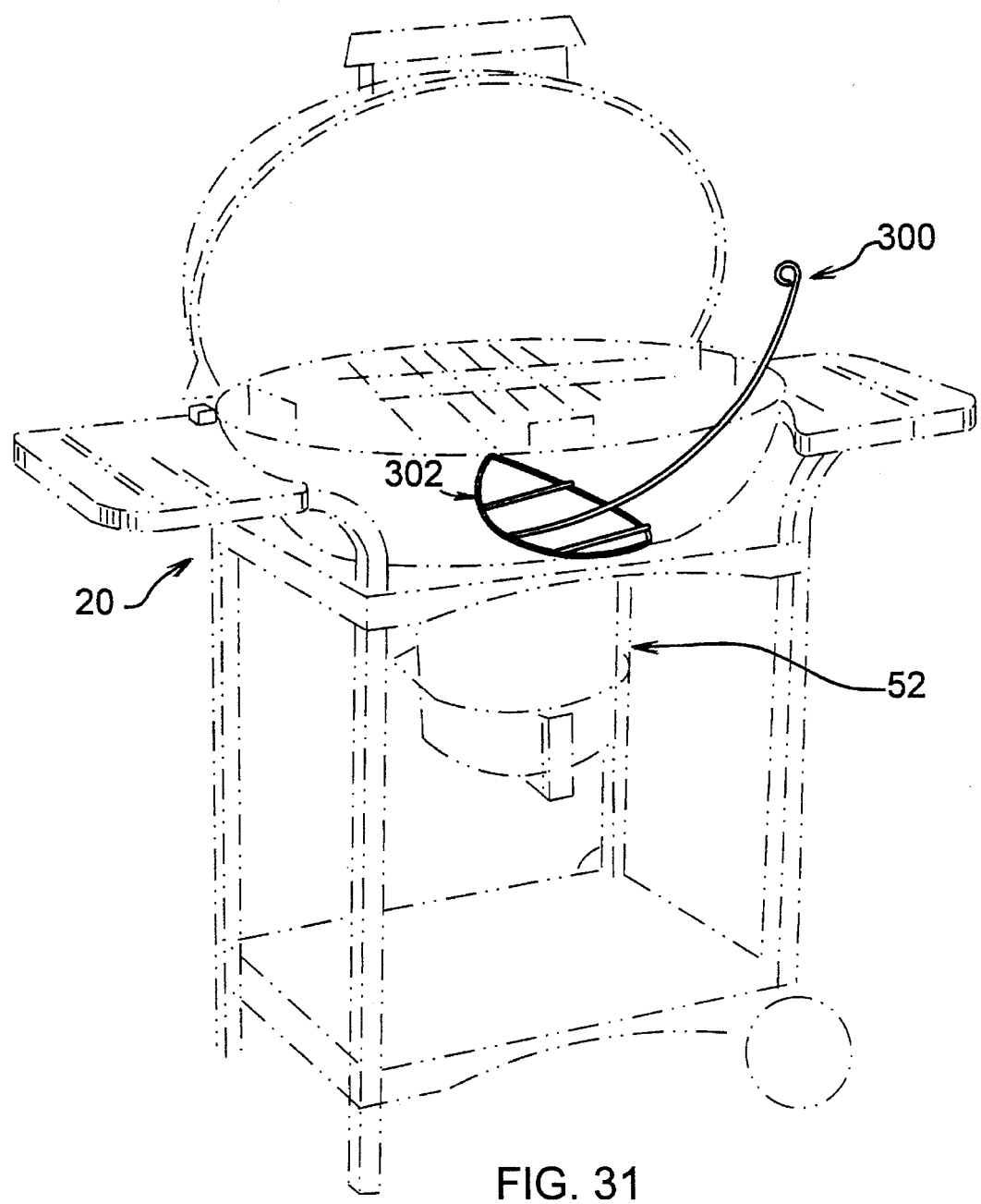
FIG. 31 is a front perspective view of the ash sweep assembly showing the position of the ash sweep in the grill bowl wherein the grill is shown in phantom lines.
Figure 32:
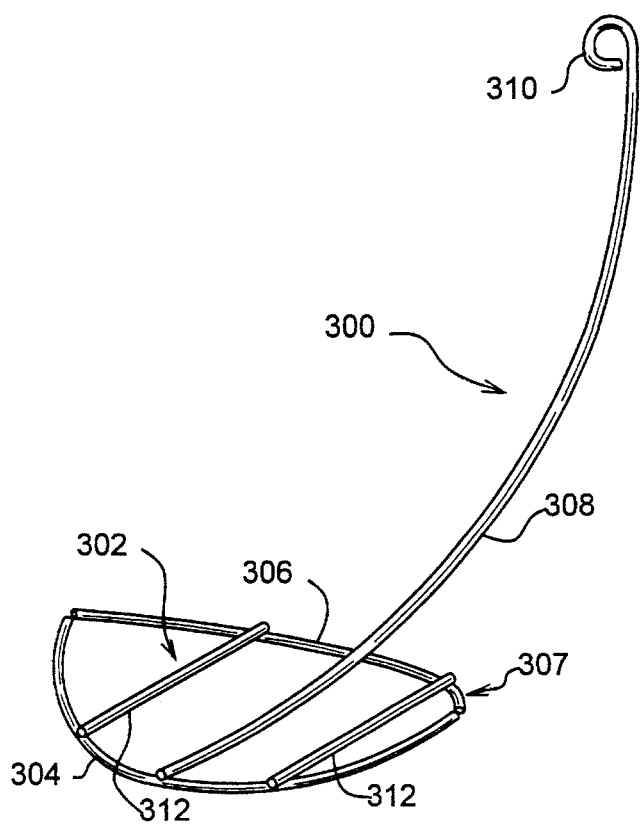
FIG. 32 is a perspective view of the ash sweep.
Figure 33:
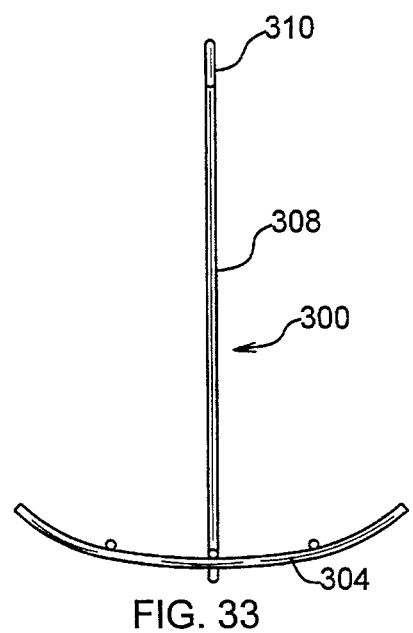
FIG. 33 is a front plan view of the ash sweep.
Figure 34:
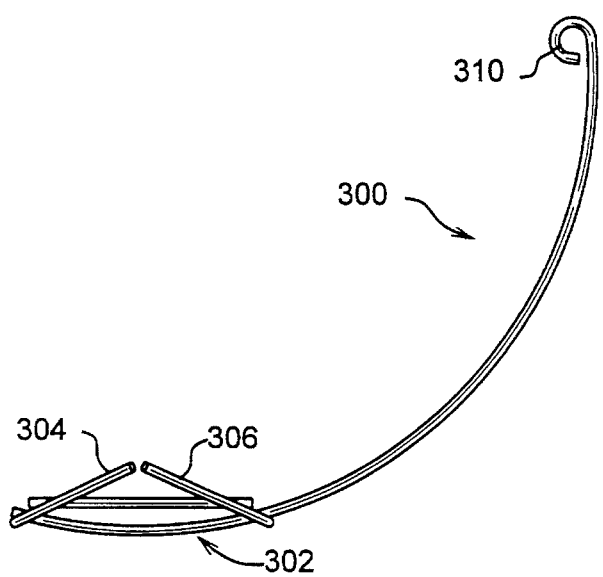
FIG. 34 is a side elevational view of the ash sweep.
Figure 35:
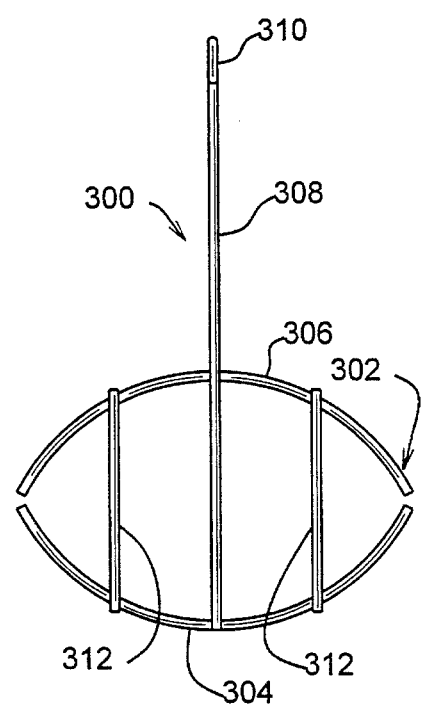
FIG. 35 is a top plan view of the ash sweep.

As shown in FIGS. 29–30 and 23, the underside of the integral shelf lid holder 200 is substantially hollow having a rim or lip 202 extending around the periphery of the shelf 200. The integral shelf lid holder includes a plurality of spaced apart reinforcement projections 204 in the form of "X's" extending around the outer front and rear edges of the lip 202 on the underside of the integral shelf lid holder 200. The projections 204 are aligned to support the integral shelf lid holder 200 on the laterally extending portions 144 and 146 described previously. Moreover, at least one of the projections is formed having a hole therein alignable with holes formed in the laterally extending portions 144 and 146 for removably attaching the integral shelf lid holder 200 to the support structure 130 by fastening means such as screws. A plurality of triangular reinforcement members 206 are formed connecting the portion of the lip 202 extending along the outer exterior edge away from the grill bowl 22. The curvature of the lip 202 fitting around the bowl 22 provides additional structural support for supporting the lid 24. A small cutaway section or notch 208 allows the shelf to set on the laterally extending portions 144 and 146. A lid holder stop 210 is formed extending upwardly from the surface and near the inside rear portion of the integral shelf lid holder 200 for engaging guide on the lid 24. The lid holder stop 210 is arranged or formed near the inner rear lip of the shelf to facilitate cradling of the lid 24 on the lid holder stops 210. It is also contemplated that a cradle bracket 64 may also be attached to the top surface of the shelf 200 as an alternative stop means to the preferred embodiment; however, the additional of an add on bracket detracts from the contemporary styling associated with an inegral stop means. Guide projections 72 and 74 are mounted on the flanged edge of the lid 24 for engaging the lid holder stops 210 to insure that the lid 24 is in proper alignment.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

What is claimed is:

1. A barbecue grill assemlby for cooking foods comprising:

a bowl and domed, free-standing lid mating with each other and having a curved configuration at their intersection;

support means for the bowl, the support means providing access below a central portion of the bowl;

an ash collector depending from the central bowl portion, the ash collector comprising a vertically arranged tubular element including vent means and attachment means for releasably securing an ash collector tray beneath the tubular element;

a handle adjacent one side of the lid; and cradle means for catching and supporting the lid, the cradle means comprising a pair of brackets arranged on the bowl adjacent the bowl generally opposite the handle of the lid, the pair of brackets having extended surfaces facing each other and spaced apart less than a corresponding dimension of the lid, the brackets being attached to the bowl, the cradle means including a pair of integral shelf lid holders, each one comprising a shelf having a stop means formed integrally therein arranged on inner end portions of the extended surfaces for engaging the brackets, whereby lifting the lid by the handle causes the lid to move horizontally and to rotate into a generally vertical position upon engagement with the stop means of the pair of integral shelf lid holders, the lid then being cradled by the bracket surfaces and stop means of the integral shelf lid holders.

2. The barbecue grill assembly of claim 1, including an ash sweeping assembly for removal of ashes from the bowl comprising an ash sweep fitting below a grill and above the ash collector, the ash sweep comprising wire or rod rack having a pair of inwardly curving sweeping rods forming a generally elliptical central sweeping section including a long central connecting rod extending perpendicular to the sweeping rods, the central connecting rod extending outwardly forming a handle.

3. The barbecue grill assembly of claim 2, wherein the ash sweep is dish shaped for providing a complementary fit inside an elliptically shaped grill.

4. A barbecue grill assembly for cooking foods comprising:

a bowl and domed, free-standing lid mating with each other and having a curved configuration at their intersection;

support means for the bowl, the support means providing access below a central portion of the bowl;

an ash collector depending from the central bowl portion, the ash collector comprising a vertically arranged tubular element including vent means and attachment means for releasably securing an ash collector tray beneath the tubular element;

an ash sweep assembly adapted to fit below a fuel grill and above the ash collector, the ash sweep comprising wire or rod rack having a pair of inwardly curving sweeping rods forming a generally elliptical central sweeping section including a long central connecting rod extending perpendicular to the sweeping rods, the central connecting rod extending outwardly forming a handle;

a handle adjacent one side of the lid; and cradle means for catching and supporting the lid, the cradle means being mounted on a portion of the barbecue assembly and including two brackets arranged on the bowl adjacent the bowl generally opposite the handle for the lid, the two brackets having extended surfaces facing each other and spaced apart less than a corresponding dimension of the lid with stop means arranged on end portions of the extended surfaces, the brackets being attached to the bowl, whereby lifting the lid by the handle causes the lid to move horizontally along the extended bracket surfaces and to rotate into a generally vertical position upon engagement with the stop means, the lid then being cradled by the bracket surfaces and stop means.

5. The barbecue grill assembly of claim 4, wherein the ash sweep is dish shaped for providing a complementary fit inside an elliptically shaped grill.

* * * * *